United States Patent Office 3,575,859
Patented Apr. 20, 1971

3,575,859
GELLING HYDROCARBON FLUIDS WITH COM-
BINATIONS OF ALUMINUM ALKYL ORTHO-
PHOSPHATES AND AMINES
Roger F. Monroe, Midland, Mich., assignor to
The Dow Chemical Company
No Drawing. Filed Jan. 30, 1968, Ser. No. 701,568
Int. Cl. C10m 7/44, 7/30, 5/24
U.S. Cl. 252—32.5            8 Claims

ABSTRACT OF THE DISCLOSURE

Hydrocarbon liquids are gelled with small amounts of certain metal alkyl oleyl orthophosphates and amines in admixture.

---

Gelled hydrocarbons of the physical nature contemplated herein have many applications. Among these are uses as suspending media for biologically active agents. Hydrocarbon liquids employed as fracturing fluids in the treatment of subterranean formations may also be thickened with the gelling system of the instant invention.

In accordance with the instant invention, a novel thickening system is provided for the above purposes in the form of an admixture, within the liquid hydrocarbon to be gelled, of certain metal salts of alkyl oleyl phosphate mono-acids and amines, as hereinafter characterized. The admixture is usually employed in an amount from about 0.01 to about 0.5 weight percent, based on the liquid hydrocarbon. These gels will vary in consistency from a viscous liquid which will conform to the shape of its container, to essentially shape retaining solid materials.

As used herein, the terminology "gel" or "gelation" is to be distinguished from thickened solutions in which the simple viscosity is increased according to some function of the concentration of dissolved thickening solute. More specifically, the "gel" consistency will not disappear on dilution of the solution. With sufficient dilution, the solvent swollen gelling agent will appear as distinct phase in suspension. Moreover, the gelled structure is temperature sensitive in that it will break down at a relatively definite temperature but upon cooling, the gel structure will be reformed.

The useful metal dialkyl orthophosphates are characterized according to the following formula:

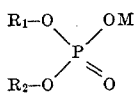

wherein M is an aluminum, gallium, lanthanum, cerium, erbium, thorium or strontium ion. $R_1$ is a short chain alkyl having from 1 to 8 carbons and $R_2$ is oleyl.

The amines employed in the aforedescribed combination gelling system include alkyl and alkanol amines, with up to 4 carbons, such as ethyl and propyl amines and ethanol and propanol amines. Also useful are alkylene polyamines including ethylenediamine, diethylenetriamine, triethylenetetraamine and the analogous series of propylene and butylene amines having molecular weights up to about 400. Particularly effective are N-heterocyclic amines with total carbons up to about 30, such as piperazine, including various alkyl ring substituted derivatives of piperazine, such as 2,6-dimethyl piperazine, and 2,5-dimethyl piperazine. Other useful N-heterocyclic amines include piperidine, pyrrolidine, picoline and imidazole, as well as the various alkyl ring substituted derivatives of such heterocyclics. Preferred are the ring substituted imidazolines produced as reaction products of fatty acids with amino ethyl ethanol amines, diethylenetriamine and higher polyamines.

Liquid hydrocarbons gelled with the aforedescribed combination of diester phosphate salts and amines include the aliphatic and aromatic hydrocarbons individually and in mixtures. Exemplary of such materials are heptane, octane, nonane, decane, benzene, toluene, ethyl benzene, gasoline, kerosene, lubricating oils and the like. Some thickening will be achieved by employing as little as about 0.1 percent by weight of the ester phosphate salt-amine combination. Generally, the hydrocarbon liquids will be converted to essentially solid materials with as little as about 0.5 percent by weight of the combination. Larger amounts may be employed, if desired. In the combination, from about .05 to about 1 part by weight of the amine will be employed per part by weight of the diester phosphate salt.

The metal salts of the diester phosphate mono acids employed as one component of the described thickening combination can be prepared in situ within the liquid hydrocarbon to be thickened by mixing therein the dialkyl phosphate mono acid and a suitable metal base, e.g. aluminum, gallium or lanthanum hydroxide. Upon mild heating of the resulting mixture, e.g. from about 90 to 200° F., the acid is neutralized to form the phosphate mono salt. These salts may also be prepared as a concentrate in a separate liquid hydrocarbon, which may contain up to as much as 75 percent by weight of the dissolved diester phosphate salt. The concentrate is added to the liquid hydrocarbon to be thickened in the amount required to give the desired concentration of the diester phosphate mono salt. The amine component of the combination is added directly to the liquid hydrocarbon to be thickened, either prior to or subsequent to the addition of the phosphate. Mild heating, e.g. up to temperatures of about 240° F. accelerates the gelling effect of the combination.

The diester phosphate mono acids employed herein are well known in the art. Reference may be taken to U.S. Pats. 2,983,678 and 2,983,679 for methods of preparation.

Of special interest is the reversibility of the gelation hereinbefore described by incorporating into the gel a nitrogen compound soluble in the system. Suitable for this purpose is an excess of the amine employed in the gelling system.

The following specific examples will serve to illustrate the application and use of the described diester phosphate salt-amine combinations as thickening agents for liquid hydrocarbons.

EXAMPLE 1

A reaction vessel equipped with a mechanical stirrer, thermometer and condenser was charged with 3936 grams of kerosene. To the kerosene was added 564 grams of ethyl oleyl orthophosphoric mono acid and 39 grams of aluminum hydroxide with rapid stirring. The resulting mixture was heated to 125° C. for about 30 minutes. Water produced upon neutralization of the acid was distilled in part during the reaction period and finally completely removed under reduced pressure. The solution was filtered to remove any unreacted aluminum hydroxide. The final concentrate contained approximately 10 percent by weight of aluminum ethyl oleyl orthophosphate (Al-EOP).

EXAMPLE 2

To 400 grams of a liquid hydrocarbon characterized as an SAE 10 mineral oil was added 12 grams of the phosphate concentrate prepared in Example 1 (1.2 grams of phosphate) and .25 gram of anhydrous piperazine. To accelerate gelation, the mixture was heated to approximately 100 to 130° C. for 1 hour. Upon cooling, the oil was a very viscous gelled liquid on which viscosity measurements were taken with a Cannon-Ubbelohde tube viscosimeter at 100° F. and 210° F.

The comparative viscosities of the base oil, oil with dissolved concentrate, and oil with combinations of phosphate and piperazine are set forth at two temperature levels in the following table.

TABLE I.—VISCOMETRIC ANALYSIS OF OIL CONTAINING Al-EOP PLUS PIPERAZINE

| | Wt. percent conc. | | Kinematic viscosity (cs.) | | Solution character |
|---|---|---|---|---|---|
| Combination | Al-EOP | Piperazine | 100° F. | 210° F. | |
| Run No.: | | | | | |
| 1........ Base oil (SAE 10)............... | 0 | 0 | 35.5 | 5.5 | Pourable liquid. |
| 2........ Base oil plus Al-EOP........... | .4 | 0 | 120.09 | 16.9 | Do. |
| 3........ Base oil plus Al-EOP plus piperazine. | .40 | .25 | 263.6 | 222.9 | Gel. |

The base oil with aluminum ethyl oleyl orthophosphate viscosity was increased from 120 (cs.) at 100° F. to 263.6 (cs.) by the addition of piperazine. The resulting composition was a gel and maintained this characteristic at 210° F. These gels will crawl up a rotating agitator shaft in contrast to a vortex induced by similar agitation of a pourable liquid.

EXAMPLE 3

Following a procedure similar to that employed above, a base liquid hydrocarbon was gelled with various combinations of the aluminum ethyl oleyl phosphate (EOP) prepared in Example 1 with different amines. The compositions and viscometric analysis of the thickened oil are set forth in the following Table II.

TABLE II.—VISCOMETRIC ANALYSIS OF OIL CONTAINING Al-EOP PLUS NITROGEN COMPOUNDS

| | Wt. percent conc. | | Kinematic viscosity (cs.) | | Solution character |
|---|---|---|---|---|---|
| Nitrogen Compounds | Al-EOP | Nitrogen compound | 100° F. | 210° F. | |
| Run No.: | | | | | |
| 1........ Base oil plus Al-EOP.................... | .4 | ........ | 120 | 16.9 | Pourable liquid. |
| 2........ 3-picoline............................ | .4 | .25 | 278 | 9.3 | Gel. |
| 3........ Pentaethylene-tetraamine............. | .4 | .25 | 211.75 | 65.0 | Do. |
| 4........ Pyrrolidine.......................... | .4 | .25 | 199.4 | 52.1 | Do. |
| 5........ 2-(8-heptadecenyl)-2-imidazoline-1-ethanol. | .4 | .25 | 108 | 74.3 | Do. |
| 6........ 11-(1-(2-aminoethyl)-2-imidazolin-2-yl)-9-heptadecen-7-ol... | .4 | .25 | 255 | 50.2 | Do. |

In a manner similar to the foregoing, a like gelling effect is achieved by substituting gallium, lanthanum, cerium, erbium, thorium and strontium salts of ethyl oleyl orthophosphates for the Al-EOP employed above. Although the ethyl oleyl diester phosphate mono acids are the preferred starting materials, the ethyl group can be replaced by any alkyl group having from 1 to 8 carbon atoms to achieve similar gelling effects. For example, amines such as ethanolamine, ethylenediamine, piperazine, piperidine, pyrrolidine, picoline, imidazole and alkyl ring substituted derivatives of the heterocyclics can be employed in conjunction with one or more diester phosphate mono acids, such as the methyl oleyl, butyl oleyl and octyl oleyl diesters thereof, to prepare hydrocarbon gels in accordance with the invention. When employed in amounts above about 1 part by weight per part by weight of the phosphate, the thickening effect was observed to be reversed.

With the use of sufficient excess amounts of the amine the thickening effect of the phosphate alone was reduced to the point at which the hydrocarbon essentially recovered its initial viscosity.

What is claimed is:
1. A gelled composition comprising a liquid hydrocarbon containing a gelling quantity of an admixture of (1) a dialkyl phosphate metal salt characterized according to the formula:

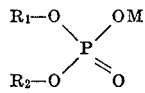

wherein M is an aluminum, gallium, lanthanum, cerium, erbium, thorium or strontium ion, $R_1$ is an alkyl group having from 1 to 8 carbons and $R_2$ is oleyl and (2) from about 0.01 to about 1 part by weight, per part by weight of the dialkyl phosphate metal salt, of an amine selected from the group consisting of alkyl amines having 2–4 carbons, alkanol amines having 2–4 carbons, alkylene polyamines having molecular weight up to 400, piperazine, alkyl-substituted piperazine, picoline, alkyl-substituted picoline, piperidine, alkyl-substituted piperidine, pyrrolidine, alkyl-substituted pyrrolidine, imidazole, alkyl-substituted imidazole, and imidazolines produced as a reaction product of a fatty acid with an alkylene polyamine or alkanol amine having up to about 30 carbons.

2. A composition as in claim 1 containing from about 0.01 to about 5 weight percent of the combination of the dialkyl phosphate metal salt and amine.

3. A composition as in claim 1 wherein the phosphate is aluminum alkyl oleyl phosphate.

4. A composition as in claim 3 wherein the amine is piperazine.

5. A composition as in claim 3 wherein the amine is a picoline.

6. A composition as in claim 3 wherein the amine is an alkylene polyamine.

7. A composition as in claim 3 wherein the amine is an imidazoline produced as a reaction product of a fatty acid with an alkylene polyamine.

8. A method for treating a liquid hydrocarbon which comprises (1) adding amounts sufficient to form a gel of a dialkyl phosphate metal salt characterized according to the formula:

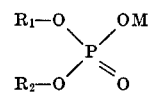

wherein M is an aluminum, gallium, lanthanum, cerium, erbium, thorium, or strontium ion, $R_1$ is an alkyl group having from 1 to 8 carbons and $R_2$ is oleyl and an amine selected from the group consisting of alkyl amines having 2–4 carbons, alkanol amines having 2–4 carbons, alkylene polyamines having molecular weight up to 400, piperazine, alkyl-substituted piperazine, picoline, alkyl-substituted picoline, piperidine, alkyl-substituted piperidine, pyrrolidine, alkyl-substituted pyrrolidine, imidazole, alkyl-substituted imidazole, and imidazolines produced as a reaction product of a fatty acid with an alkylene polyamine or alkanol amine having up to about 30 carbons to a liquid hydrocarbon, wherein the amine is present in a ratio of from about 0.01 to about 1 part by weight per part by weight of the dialkyl phosphate metal salt, and (2) reversing the gelation in (1) by incorporating in the gelled hydrocarbon an excess of the amine used in (1).

References Cited
UNITED STATES PATENTS

| | | | |
|---|---|---|---|
| 2,983,679 | 5/1961 | Pellegrini et al. | 252—32.5 |
| 3,000,821 | 9/1961 | Giovanni et al. | 252—32.5 |
| 3,309,314 | 3/1967 | Price et al. | 252—32.5 |

DANIEL E. WYMAN, Primary Examiner

I. VAUGHN, Assistant Examiner

U.S. Cl. X.R.

252—50, 51.5; 44—7